United States Patent [19]

Ou-Yang

[11] Patent Number: 5,120,137
[45] Date of Patent: Jun. 9, 1992

[54] TIME AND TEMPERATURE INDICATING DEVICE

[75] Inventor: David T. Ou-Yang, Woodbury, Minn.

[73] Assignee: Minnesota Mining and Manufacturing Company, St. Paul, Minn.

[21] Appl. No.: 677,137

[22] Filed: Mar. 29, 1991

[51] Int. Cl.$^5$ .................. G01K 11/06; G01K 3/00
[52] U.S. Cl. ................. 374/106; 116/219; 374/102; 374/160
[58] Field of Search ............ 374/106, 160, 162, 103, 374/102; 116/219

[56] References Cited

U.S. PATENT DOCUMENTS

| | | | |
|---|---|---|---|
| 3,006,313 | 10/1961 | Huyck et al. | 116/114 |
| 3,065,083 | 11/1962 | Gessler | 374/106 |
| 3,243,303 | 3/1966 | Johnson | 374/106 |
| 3,243,733 | 3/1966 | Johnson | 374/102 |
| 3,677,088 | 7/1972 | Lang | 374/160 |
| 3,954,011 | 5/1976 | Manske | 116/219 |
| 3,962,920 | 6/1976 | Manske | 374/160 |
| 3,967,579 | 7/1976 | Seiter | 374/106 |
| 3,981,683 | 9/1976 | Larsson et al. | 374/106 |
| 3,999,946 | 12/1976 | Patel et al. | 23/253 |
| 4,154,107 | 5/1979 | Giezen et al. | 374/102 |
| 4,428,321 | 1/1984 | Arens | 116/217 |
| 4,457,252 | 7/1984 | Manske | 116/216 |
| 4,789,637 | 12/1988 | Preziosi et al. | 436/2 |
| 4,793,717 | 12/1988 | Manske | 374/160 |

FOREIGN PATENT DOCUMENTS

| | | | |
|---|---|---|---|
| 58-501920 | 10/1982 | Japan . | |
| 0055234 | 3/1985 | Japan | 374/106 |
| 0647379 | 12/1950 | United Kingdom | 374/160 |
| 2038478 | 7/1980 | United Kingdom | 374/106 |

*Primary Examiner*—William A. Cuchlinski, Jr.
*Assistant Examiner*—Diego F. F. Gutierrez
*Attorney, Agent, or Firm*—Gary L. Griswold; Walter N. Kirn; Leland D. Schultz

[57] ABSTRACT

An indicating device for indicating the time and temperature history of an object. The indicating device includes a reservoir containing an indicating material that liquefies at or above a predetermined temperature mounted on a base sheet, a removable barrier impervious to the indicating material interposed between the reservoir and a wick, wherein the wick is placed in contact with the reservoir after the barrier is removed to enable the migration of the indicating material along the wick at a controlled rate. The wick is constructed of generally hydrophobic materials so that the migration rate of the indicating materials along the wick is generally independent of changes in the ambient humidity.

19 Claims, 2 Drawing Sheets

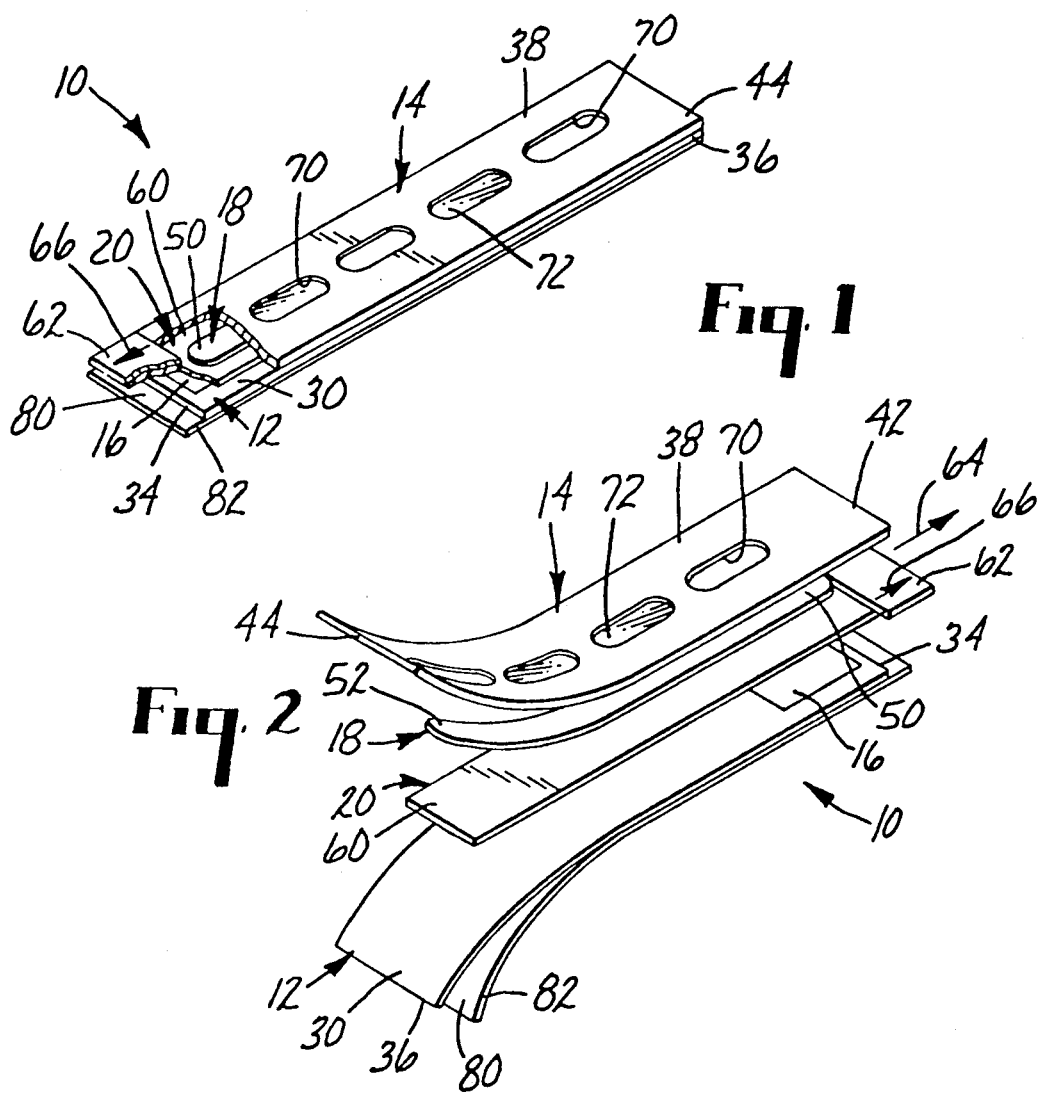
Fig. 1
Fig. 2
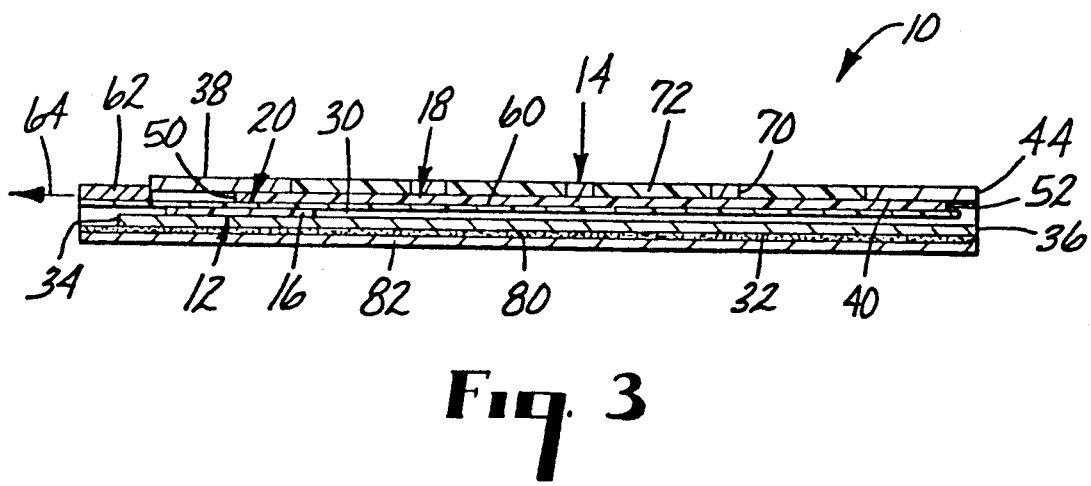
Fig. 3

TIME AND TEMPERATURE INDICATING DEVICE

TECHNICAL FIELD

The present invention relates to indicating devices for recording and displaying the time and temperature history of an object.

BACKGROUND ART

Devices have been known in the past for use with materials or objects that are sensitive to fluctuations in the ambient temperature. For instance, various pharmaceuticals, units of blood, or photographic chemicals must all be maintained below certain temperatures prior to use. If these types of materials are exposed to elevated temperatures for long enough periods of time, it is desirable to provide an unambiguous indication of that fact so that the materials can be disposed of or recognized as having a reduced shelf life or effectiveness. Generally, exposure for a shorter period of time at an elevated temperature may be as damaging as an extended period of time at a lower temperature.

U.S. Pat. No. 3,962,920 entitled "Reservoir Pad For Time Indicator" and U.S. Pat. No. 3,954,011 entitled "Selected Time Interval Indicating Device", the contents of both of which are incorporated herein by reference, both disclose an indicating device that includes a reservoir containing an indicating material, preferably a colored organic material, that liquefies when exposed to temperatures at or above a predetermined temperature. A wick, made of a wood pulp paper, is provided adjacent the reservoir. Prior to use, the reservoir and wick are separated by a barrier. When placed in contact with an object, such as a container of blood, the barrier is removed. If temperatures at or above a predetermined temperature are encountered, the indicating material liquefies and begins to migrate along the wick at a controlled rate. The progress of the indicating material can be observed and, if it passes a known point on the wick, it can readily be determined that the blood has been degraded and is unfit to use. If the object that the device is attached to is a container of pharmaceuticals, the pharmaceuticals may not be harmful if used, but may be rendered ineffective. Such devices have been marketed in the past by the Minnesota Mining and Manufacturing Company of St. Paul, Minn. under the trademark "MonitorMark" TM brand indicating devices.

Time and temperature indicating devices such as these are useful in transporting or storing perishable substances as described. However, such products or substances are frequently used in a wide variety of remote or less developed areas of the world. As a consequence, the climates that the indicating devices are exposed to vary dramatically, and facilities, such as refrigerators, available to safely store and transport the objects are less reliable and accessible. It has been found that variations in ambient humidity have a direct affect on the accuracy of the indicating devices. That is, the rate of migration of the indicating material through the wick will be altered as the ambient humidity changes. Climates that have a high ambient humidity will tend to retard the progress of the indicating material along the wick and thus inaccurately indicate that the substance attached to the device is still usable. For instance, in environments having a relative humidity of at least 90%, conventional indicating devices have been shown to have an observed rate of migration that is reduced by 200–300% over the expected rate of migration. It is believed that this effect is related to the absorption of atmospheric moisture by the generally hydrophilic wicking material, such as wood pulp paper previously mentioned. The presence of the absorbed moisture tends to increase the surface tension of the fibers in the reservoir, thereby attenuating the migration of the indicating material by capillary action along the wicking member. Likewise, climates having a low ambient humidity will tend to accelerate the expected rate of migration of the indicating material, thus falsely indicating that the substance has been degraded. Either alternative is undesirable, with the former case having potentially more serious consequences.

None of the existing indicating devices have adequately addressed the problem of variations in the ambient humidity and the effect of that variation on the accuracy of the time and temperature indicating device.

DISCLOSURE OF INVENTION

The present invention provides an indicating device for displaying the time and temperature history of an object. The indicating device includes a reservoir and a quantity of an indicating material contained in the reservoir. The indicating material is solid below a predetermined temperature and liquid at or above the predetermined temperature. A generally hydrophobic wicking member is provided having a first end and a second end, with the first end of the wicking member being adjacent to the reservoir. A removable barrier member is interposed between the reservoir and the first end of the wicking material The barrier member is impervious to the indicating material. The barrier member may be removed to enable the indicating material to migrate at a controlled rate from the first end of the wicking member towards the second end of the wicking member when exposed to an ambient temperature at or above the predetermined temperature so as to liquefy the indicating material. The flow rate of the indicating material in the generally hydrophobic wicking material being generally independent of the ambient humidity to provide a visual indication of the time and temperature history of the object.

BRIEF DESCRIPTION OF DRAWINGS

The present invention will be further described with reference to the accompanying drawings wherein like reference numerals refer to like parts in the several views, and wherein:

FIG. 1 is an isometric view of an indicating device according to the present invention;

FIG. 2 is an exploded isometric view of the indicating device of FIG. 1;

FIG. 3 is a cross sectional view along a longitudinal axis of the indicating device of FIG. 1.

DETAILED DESCRIPTION

Figure 4:
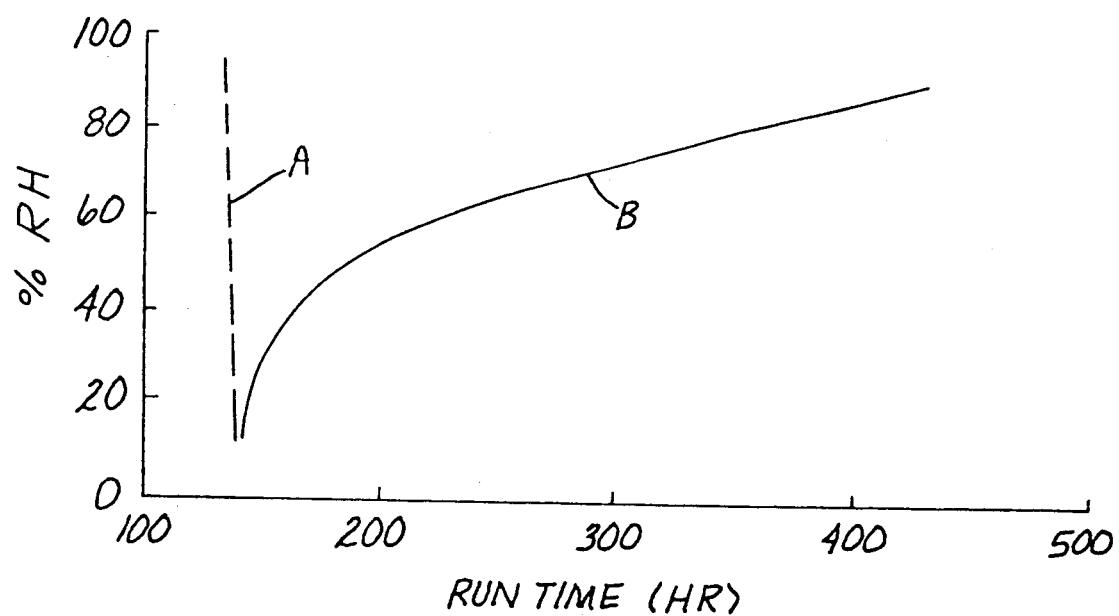
FIG. 4 is a graphical representation of the effect of humidity on the accuracy of a conventional indicating device and the present invention.

Referring now to the drawing, there is shown a time and temperature indicating device according to the present invention generally designated by the reference numeral 10.

Generally, the indicating device 10 comprises a base sheet 12, a cover sheet 14, a reservoir 16, a wick or wicking member 18, and a barrier 20. Base sheet 12 includes first major surface 30 and opposing second major surface 32, as well as first end 34 and second end 36. Cover sheet 14 includes first major surface 38 and second major surface 40 facing first major surface 30 of the base sheet, as well as first end 42 and second end 44 aligned with corresponding first and second ends 34 and 36 of the base sheet 12. Preferably, the base sheet 12 and the cover sheet 14 are coextensive and bonded to each other along their longitudinal edges and the second end edges 36 and 44, respectively.

Reservoir 16 is mounted on first major surface 30 of the base sheet adjacent first end 34. Reservoir 16 may be constructed of any porous matrix that is able to absorb or entrap the indicating material, as further discussed herein below, and which will allow the indicating material to migrate into the wicking member 18 when in contact therewith. The following is a non-limiting list of materials that may be used to construct the reservoir: fibrous materials made from woven or non-woven natural or synthetic fibers, such as cellulosic materials, particularly Kraft blotter papers, sponges, or flocked porous coatings. An example of a commercially available material that may be employed as the reservoir in the present invention is 100 pound Verigod blotting paper available from the James River Corporation of Richmond, Va. 23217.

A quantity of indicating material (not shown) is absorbed into the reservoir. The indicating material generally is a substance that is solid below a predetermined temperature and is liquid at or above the predetermined temperature. The material may be selected or prepared to correspond to a desired temperature for the product or substance that the indicating device is intended to work with. Preferably, the indicating material is a colored organic compound such as a fatty acid, an alcohol and/or their derivatives. Preferably, the indicating material has a viscosity of between 6.0 and 12.0 centipoise, but no greater than 20.0 centipoise. The following is a non-limiting list of materials, and their respective melting temperatures that may be utilized as the indicating material of the present invention: Octadecyl Acetate (31° C.); Decyl Caprylate (10° C.); n-Butyl Myristate (5° C.); and Octyl Caprylate (−17° C.).

Wicking member 18 is mounted on the second major surface 40 of the cover sheet 14. The wicking member 18 is constructed of a generally hydrophobic material. That is, the wicking member 18 will not absorb significant quantities of moisture from the environment, which detrimentally effects operation of the indicating device, as previously described. Preferably, the wicking member is a non-woven web of a hydrophobic polymeric material, such as polypropylene, polyethylene, polyester or blends thereof. Most preferably, the wicking member is a non-woven spunbonded sheet formed by first spinning continuous strands of very fine, interconnected polymeric fibers, such as high density polyethylene (HDPE), polypropylene, polyester or the like and blends thereof. The fibers are then bonded together with heat and pressure in a manner known in the art and described in Bulletin TK-3 of the E. I. DuPont deNemours and Company, Inc. of Wilmington, Del. the contents of which are incorporated herein by reference.

The wicking properties of the wicking member 18, along with the viscosity of the indicating materials and the properties of the reservoir 16 must be carefully controlled so that the migration of the indicating material progresses at a desired rate along the wicking member from a first end 50 adjacent the reservoir 16, towards a second end 52 aligned towards the second ends 32 and 44 of the base sheet and the cover sheet, respectively. The wicking properties of the wicking member is caused by capillary action acting on the indicating material.

In the preferred embodiment of the invention, the wicking member 18 is constructed so as to have a caliper of between 1 mil and 30 mils (0.025 mm to 0.76 mm) and most preferably, between 3 mils to 10 mils (0.076 mm to 0.25 mm). Another preferred characteristic is to have a Gurley porosity between 50 and 2500 seconds/400 cubic centimeters. Most preferably, the Gurley porosity of the wicking member is between 100 and 1,000 seconds/400 cubic centimeters. Finally, it is preferred that the wicking member 18 have a surface tension of between 25 to 60 dynes/centimeter at 20° C., and most preferably between 28 and 45 dynes/centimeter at 20° C.

Prior to use, a barrier is interposed between the reservoir 16 and the wick 18. In the illustrated embodiment, the barrier takes the form of a strip 60 constructed of a material impervious to the indicating material. The barrier strip 60 may be constructed of a polymeric film such as polyester or polyolefin, or the like. A tab 62 is attached to one end of the barrier strip and extends through the unbonded first end edges of the base sheet and cover sheet. The barrier strip is frictionally secured in position.

To activate the indicating device, the tab 62 is manually grasped and pulled in direction 64 (aided by directional arrow 66 or like indicia printed thereon) to extract the barrier strip from the device and place wick 18 and reservoir 16 in contact with each other. Thereafter, when the device is exposed to a temperature at or above a predetermined temperature, the indicating material begins to liquefy and migrate along the wick.

Cover sheet 14 includes one or more windows or openings 70 at spaced intervals and extending towards second end 44. Preferably, a light transmissive window material 72 is mounted on the cover sheet so as to isolate the wick from the environment and avoid contamination. The windows 70 enable the progress of the indicating material within the wick to be easily visually detected externally from the device. The first major surface 38 of the cover sheet may include indicia (not shown) providing instructions and interpreting the time and temperature history of the device. For instance, such indicia may indicate that when the migration of the indicating material reaches the last window, the object to which the indicating device is attached is no longer suitable for use.

FIG. 4 illustrates the improved performance of the present invention (Line A) compared to a commercially available MonitorMark TM brand indicating device (Line B). As can be readily discerned, the migration rate of the conventional indicator is decreased dramatically over time with increasing ambient humidity, whereas, in the present invention, the migration rate is generally independent of humidity.

Table 1 below also illustrates the effectiveness of the present invention compared to conventional MonitorMark TM brand indicating devices.

TABLE 1

| % RH | Run Time (hrs.) (*1) | |
|---|---|---|
| | Indicators with prior art hydrophilic wicking member (*2) (wood pulp paper) | Indicators with hydrophobic wicking member (*3) (HDPE non-woven web) |
| 15 | 148.71 | 140.93 |
| 20 | 151.73 | 138.48 |
| 43 | 158.88 | 137.06 |
| 56 | 199.12 | 127.83 |
| 66 | 260.83 | 131.64 |
| 81 | 350.82 | 129.55 |
| 92 | 432.41 | 127.66 |

(*1) Time for indicating material to travel 53.5 mm at 33° C.
(*2) Chemical wt. = 0.0300 gm.
(*3) Chemical wt. = 0.0270 gm.

Means may be provided for securely attaching the indicating device 10 of the present invention to an object, such as a container of pharmaceuticals. In the illustrated embodiment, the attachment means takes the form of a layer of adhesive 80, preferably a pressure sensitive adhesive, applied to the second major surface 32 of the base sheet 12. A removable liner 82 may be applied to cover the layer of adhesive prior to use.

The present invention has now been described with reference to several embodiments thereof. It will be apparent to those skilled in the art that many changes can be made in the embodiments described without departing from the scope of the present invention. For instance, although the barrier is illustrated as a polymeric film that is interposed between the reservoir and the wick and then pulled to activate the indicating device, it is within the spirit and scope of the present invention to provide a reservoir that is a cavity formed by a polymeric bubble or like structure. The bubble acts as a barrier between the indicating material and the wicking member, and may be ruptured to enable communication between the indicating material contained within the reservoir and the wick. Thus, the scope of the present invention should not be limited to the structures described in this application, but only by structures described by the language of the claims and the equivalents of those structures.

What is claimed is:

1. An indicating device for displaying the time and temperature history of an object, comprising:
   (a) a reservoir mounted on a base means;
   (b) a quantity of an indicating material contained in the reservoir, said indicating material being solid below a predetermined temperature and liquid at or above said predetermined temperature;
   (c) a generally hydrophobic wicking member having a first end and a second end, said first end of said wicking member being adjacent said reservoir; and
   (d) a removable barrier member interposed between said reservoir and said first end of said wicking member, said barrier member being impervious to said indicating material;
   (e) wherein said barrier member may be removed to enable said indicating material to migrate at a controlled rate from said first end of said wicking member towards said second end of said wicking member when exposed to an ambient temperature at or above said predetermined temperature so as to liquefy said indicating material, with said flow rate of said indicating material in said generally hydrophobic wicking material being generally independent of the ambient humidity, to provide a visual indication of the time and temperature history of the object.

2. The indicating device of claim 1, further including means for mounting the device on the object.

3. The indicating device of claim 1, wherein said wicking member includes a strip of non-woven polymeric fibers.

4. The indicating device of claim 3, wherein said fibers of said wicking member comprise a spunbonded sheet.

5. The indicating device of claim 4, wherein said fibers are constructed of a material selected from a group consisting of: polypropylene, polyethylene, polyester, and blends thereof.

6. The indicating device of claim 1, wherein said indicating material is a colored organic material.

7. The indicating device of claim 6, wherein said indicating material has a viscosity of between 6.0 and 12.0 centipoises.

8. The indicating device of claim 1, wherein said wicking member has a caliper of between 1 mil and 30 mils, a Gurley porosity between 50 and 2500 seconds/400 cubic centimeters and a surface tension of between 25 to 60 dynes/centimeter at 20° C.

9. The indicating device of claim 1, wherein said wicking member has a caliper of between 3 mils to 10 mils, a Gurley porosity between 100 and 1,000 seconds/400 cubic centimeters, and a surface tension of between 28 and 45 dynes/centimeter at 20° C.

10. An indicating device, comprising:
   (a) a base sheet having a first end and a second end, and a first major surface and a second major surface;
   (b) a reservoir mounted on said first major surface of said base sheet proximate said first end of said base sheet, said reservoir containing a quantity of an indicating material, said indicating material remaining in a solid state below a predetermined temperature and liquefying at or above said predetermined temperature;
   (c) a wicking member mounted on said first major surface of said base sheet and having a first end adjacent said reservoir and a second end extending towards said second end of said base sheet, said wicking member adapted for conveying said indicating material from said reservoir along said wicking member towards said second end at a controlled rate when said indicating material is liquefied by exposure to a temperature at or above said predetermined level, said wicking member being constructed of hydrophobic material so that said controlled rate of conveyance of said indicating material is generally independent of ambient humidity;
   (d) a cover sheet overlying said base sheet, reservoir, and wicking member and bonded along peripheral edges to said base sheet, said cover sheet having at least one window therein overlying said wicking member through which the migration of said indicating material to a predetermined point along said wicking member may be observed externally of the device; and
   (e) a barrier film impervious to said indicating material, interposed between said reservoir containing said indicating material and said wicking material, wherein said barrier film may be removed from between said reservoir and said wicking material to enable migration of said liquefied indicating material along said wicking member towards said second end thereof at said controlled rate.

11. The indicating device of claim 10, wherein a layer of adhesive is applied to said second major surface of said base sheet, for adhering the device to a surface.

12. The indicating device of claim 11, wherein said adhesive is a pressure sensitive adhesive and further comprising a removable liner applied over said layer of pressure sensitive adhesive prior to use.

13. The indicating device of claim 10, wherein said indicating material is a colored organic material.

14. The indicating device of claim 13, wherein said indicating material has a viscosity of between 6.0 and 12.0 centipoises.

15. The indicating device of claim 10, wherein said wicking member includes a strip of non-woven polymeric fibers.

16. The indicating device of claim 15, wherein said fibers of said wicking member comprise a spunbonded sheet.

17. The indicating device of claim 16, wherein said fibers of said wicking member are constructed of a material selected from a group consisting of: polypropylene, polyethylene, polyester and blends thereof.

18. The indicating device of claim 10, wherein said wicking member has a caliper of between 1 mil and 30 mils, a Gurley porosity between 50 and 2500 seconds/400 cubic centimeters and a surface tension of between 25 to 60 dynes/centimeter at 20° C.

19. The indicating device of claim 10, wherein said wicking member has a caliper of between 3 mils to 10 mils, a Gurley porosity between 100 and 1,000 seconds/400 cubic centimeters, and a surface tension of between 28 and 45 dynes/centimeter at 20° C.

* * * * *

REEXAMINATION CERTIFICATE (2910th)
United States Patent [19]

Ou-Yang

[11] B1 5,120,137
[45] Certificate Issued Jun. 11, 1996

[54] TIME AND TEMPERATURE INDICATING DEVICE

[75] Inventor: David T. Ou-Yang, Woodbury, Minn.

[73] Assignee: Minnesota Mining and Manufacturing Company, St. Paul, Minn.

Reexamination Request:
No. 90/003,895, Jul. 5, 1995

Reexamination Certificate for:
Patent No.: 5,120,137
Issued: Jun. 9, 1992
Appl. No.: 677,137
Filed: Mar. 29, 1991

[51] Int. Cl.⁶ .................... G01K 11/06; G01K 3/00
[52] U.S. Cl. .................. 374/106; 116/219; 374/102; 374/160
[58] Field of Search ..................... 374/106, 160, 374/162, 102, 103; 116/219

[56] References Cited

U.S. PATENT DOCUMENTS

| | | | |
|---|---|---|---|
| 3,006,313 | 10/1961 | Huyck et al. | 116/114 |
| 3,065,083 | 11/1962 | Gessler | 374/106 |
| 3,243,303 | 3/1966 | Johnson | 374/106 |
| 3,243,733 | 3/1966 | Johnson | 374/102 |
| 3,414,415 | 12/1968 | Broad, Jr. | 116/219 |
| 3,479,877 | 11/1969 | Allen et al. | 374/106 |
| 3,677,088 | 7/1972 | Lang | 374/160 |
| 3,954,011 | 5/1976 | Manske | 374/102 |
| 3,962,920 | 6/1976 | Manske | 374/160 |
| 3,967,579 | 7/1976 | Seiter | 374/106 |
| 3,981,683 | 9/1976 | Larsson et al. | 374/106 |
| 3,999,946 | 12/1976 | Patel et al. | 23/253 |
| 4,148,272 | 4/1979 | Wetzold | 116/219 |
| 4,154,107 | 5/1979 | Giezen et al. | 374/102 |
| 4,353,990 | 10/1982 | Manske et al. | 435/287 |
| 4,428,321 | 1/1984 | Arens | 116/217 |
| 4,457,252 | 7/1984 | Manske | 116/216 |
| 4,789,637 | 12/1988 | Preziosi et al. | 436/2 |
| 4,793,717 | 12/1988 | Manske | 374/160 |

FOREIGN PATENT DOCUMENTS

| | | | |
|---|---|---|---|
| 58-501920 | 10/1982 | Japan . | |
| 0055234 | 3/1985 | Japan | 374/106 |
| 0647379 | 12/1950 | United Kingdom | 374/160 |
| 2038478 | 7/1980 | United Kingdom | 374/106 |
| 89/04952 | 6/1989 | WIPO . | |

*Primary Examiner*—Diego F. F. Gutierrez

[57] ABSTRACT

An indicating device for indicating the time and temperature history of an object. The indicating device includes a reservoir containing an indicating material that liquefies at or above a predetermined temperature mounted on a base sheet, a removable barrier impervious to the indicating material interposed between the reservoir and a wick, wherein the wick is placed in contact with the reservoir after the barrier is removed to enable the migration of the indicating material along the wick at a controlled rate. The wick is constructed of generally hydrophobic materials so that the migration rate of the indicating materials along the wick is generally independent of changes in the ambient humidity.

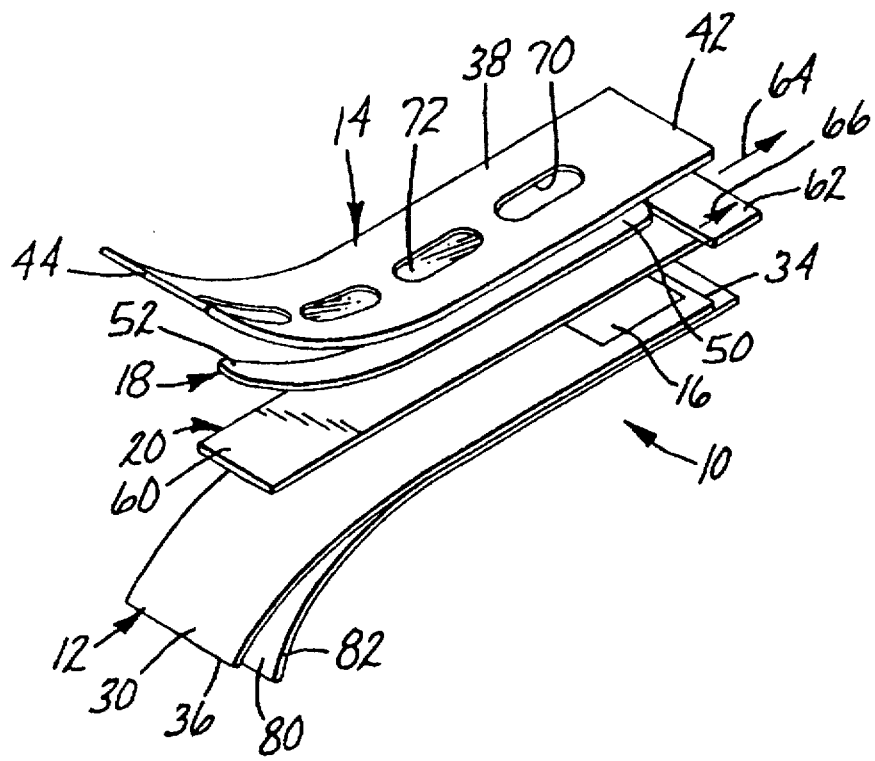

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-19 is confirmed.

Claim 1 is determined to be patentable as amended.

New claims 20-25 are added and determined to be patentable.

1. An indicating device for displaying the time and temperature history of an object, comprising:
   (a) a reservoir mounted on a base means;
   (b) a quantity of an indicating material contained in the reservoir, said indicating material being solid below a predetermined temperature and liquid at or above said predetermined temperature;
   (c) a generally hydrophobic wicking member having a first end and a second end, said first end of said wicking member being adjacent said reservoir; and
   (d) a removable barrier member interposed between said reservoir and said first end of said wicking member, said barrier member being impervious to said indicating material;
   (e) wherein said barrier member may be removed to enable said indicating material to migrate at a controlled rate from said first end of said wicking member towards said second end of said wicking member when exposed to an ambient temperature at or above said predetermined temperature so as to liquefy said indicating material, with said [flow] *generally hydrophobic wicking member causing said controlled migration* rate of said indicating material in said generally hydrophobic wicking material [being] *to be* generally independent of the ambient humidity, to provide a visual indication of the time and temperature history of the object.

20. *The indicating device of claim 1, wherein said indicating material and said generally hydrophobic wicking member are selected such that when said indicating device is exposed to 33° C., the time required for said indicating material to migrate 53.5 mm along said generally hydrophobic wicking member is at least 127 hours.*

21. *The indicating device of claim 1, wherein said indicating material is an organic material having a viscosity of between 6.0 and 12.0 centipoise and wherein said generally hydrophobic wicking member has a caliper of between 1 mil and 30 mils, a Gurley porosity between 50 and 2500 seconds/400 cubic centimeters and a surface tension of between 25 to 60 dynes/centimeter at 20° C.*

22. *The indicating device of claim 1, wherein said indicating material is an organic material having a viscosity of between 6.0 and 12.0 centipoise, wherein said generally hydrophobic wicking member has a caliper of between 1 mil and 30 mils, a Gurley porosity between 50 and 2500 seconds/400 cubic centimeters and a surface tension of between 25 to 60 dynes/centimeter at 20° C., and wherein said indicating material and said generally hydrophobic wicking member are selected such that when said indicating device is exposed to 33° C., the time required for said indicating material to migrate 53.5 mm along said generally hydrophobic wicking member is at least 127 hours.*

23. *The indicating device of claim 10, wherein said indicating material and said generally hydrophobic wicking member are selected such that when said indicating device is exposed to 33° C., the time required for said indicating material to migrate 53.5 mm along said generally hydrophobic wicking member is at least 127 hours.*

24. *The indicating device of claim 10, wherein said indicating material is an organic material having a viscosity of between 6.0 and 12.0 centipoise and wherein said generally hydrophobic wicking member has a caliper of between 1 mil and 30 mils, a Gurley porosity between 50 and 2500 seconds/400 cubic centimeters and a surface tension of between 25 to 60 dynes/centimeter at 20° C.*

25. *The indicating device of claim 10, wherein said indicating material is an organic material having a viscosity of between 6.0 and 12.0 centipoise, wherein said generally hydrophobic wicking member has a caliper of between 1 mil and 30 mils, a Gurley porosity between 50 and 2500 seconds/400 cubic centimeters and a surface tension of between 25 to 60 dynes/centimeter at 20° C., and wherein said indicating material and said generally hydrophobic wicking member are selected such that when said indicating device is exposed to 33° C., the time required for said indicating material to migrate 53.5 mm along said generally hydrophobic wicking member is at least 127 hours.*

* * * * *